Jan. 16, 1951  R. J. SERPAS  2,538,275
VERTICAL TUBE EVAPORATOR
Filed Aug. 22, 1946  2 Sheets-Sheet 1
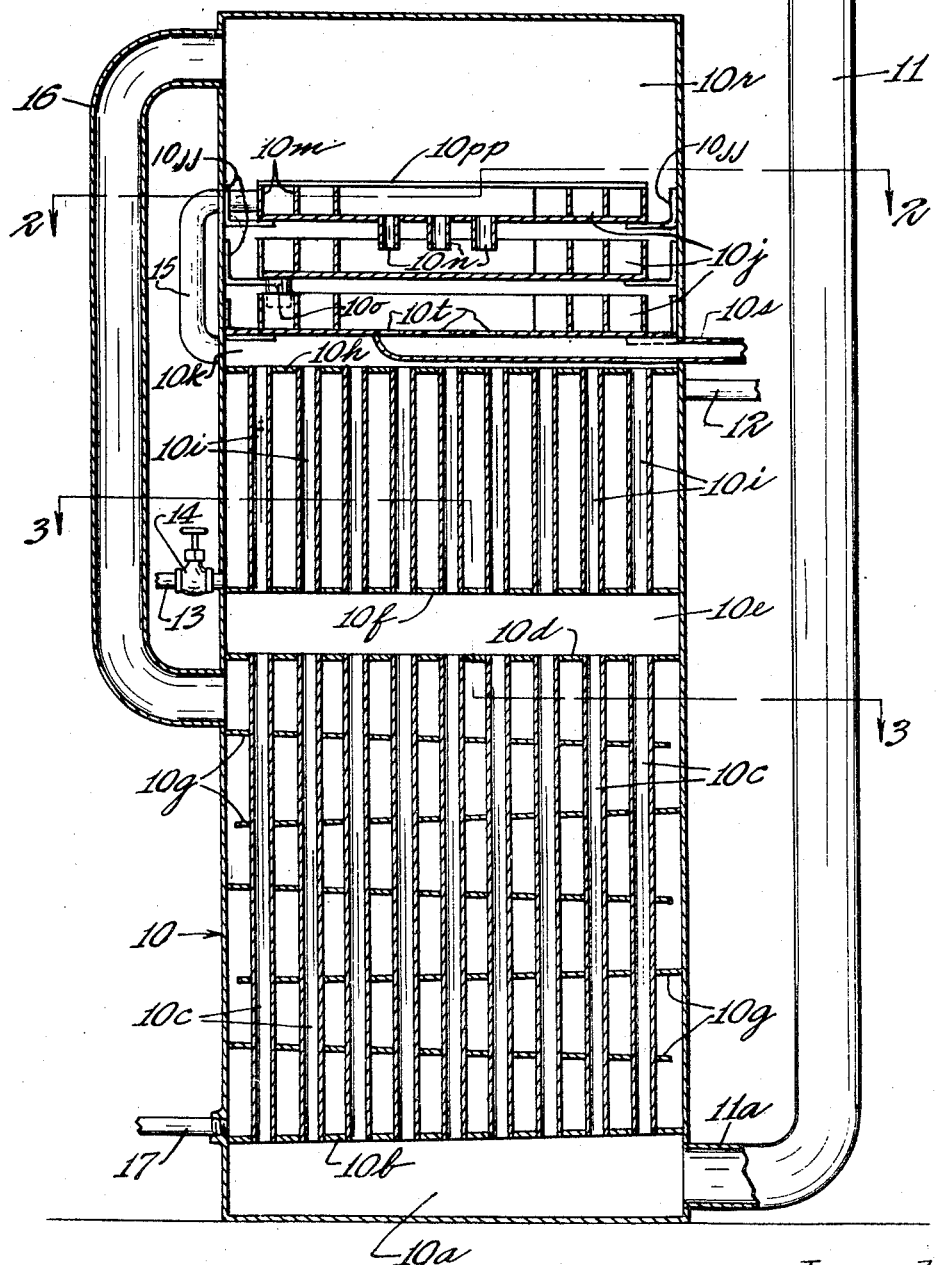
Inventor
RALPH J. SERPAS
By Chas. C. Reif.
Attorney Jan. 16, 1951 R. J. SERPAS 2,538,275
VERTICAL TUBE EVAPORATOR
Filed Aug. 22, 1946 2 Sheets-Sheet 2
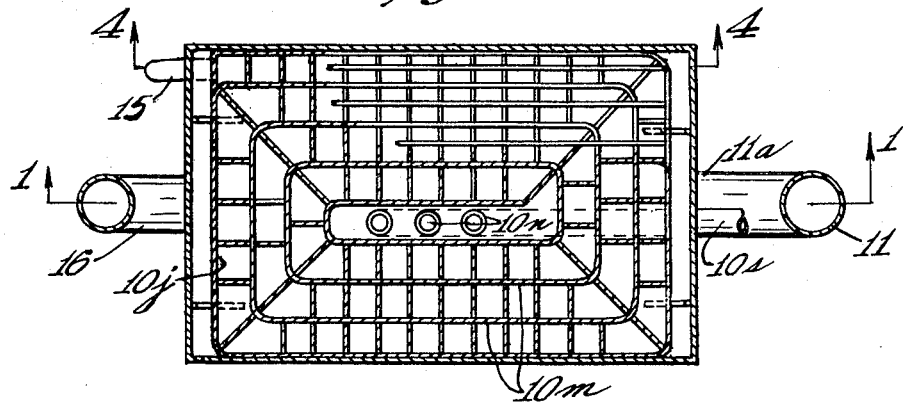
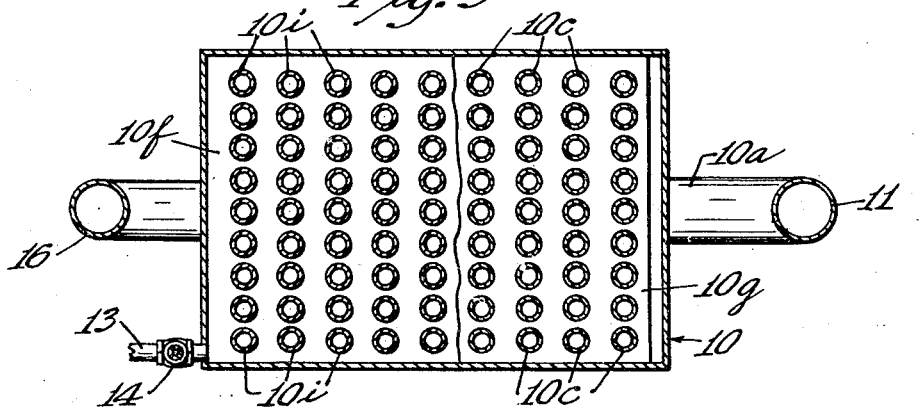
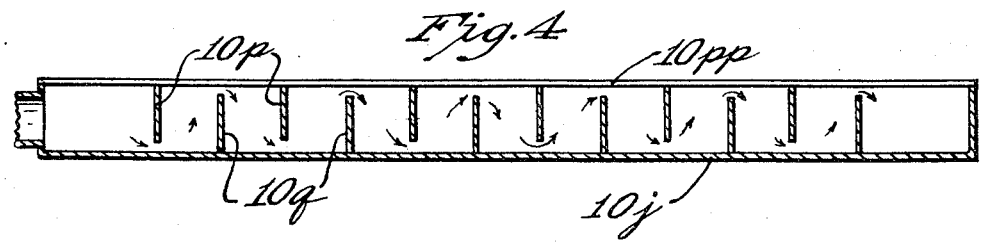
Inventor
RALPH J. SERPAS
By Chas. C. Reif.
Attorney Patented Jan. 16, 1951

2,538,275

UNITED STATES PATENT OFFICE 2,538,275

VERTICAL TUBE EVAPORATOR

Ralph J. Serpas, Minneapolis, Minn.

Application August 22, 1946, Serial No. 692,200

7 Claims. (Cl. 159—23)

This invention relates to an evaporating apparatus and while the invention is applicable to many uses, such as evaporating liquids produced in sugar mills, certain chemical establishments and for drying milk, it particularly is designed for evaporating or dehydrating the liquor from the digesters of pulp mills.

It is an object of this invention to provide a simple and efficient evaporating apparatus through which the liquid is passed comprising a multiplicity of passages for said liquid, together with a series of evaporating pans.

It is a further object of the invention to provide a drying or evaporating apparatus for liquids comprising a casing having a lower series of passages for the liquid, an upper series of passages for the liquid, said passages in the upper series being heated by a supply heating medium such as steam, together with a plurality of drying trays in the upper part of said casing, said lower series of passages being heated by passing the vapor formed about said passages.

It is another object of the invention to provide an evaporating or drying apparatus for liquids comprising a plurality of sets of passages for said liquid, together with a plurality of pans through which the liquid is passed after traveling through said passages, said pans being of novel construction and combined in a novel manner.

It is more specifically an object of the invention to provide an evaporating or drying apparatus for liquids comprising a casing having a chamber at its lower end for receiving the liquid to be evaporated, a plurality of spaced vertically extending passages communicating with said chamber through which said liquid is forced, baffles extending across said casing about said passages for directing the vapors produced in a sinuous path about said passages, a second series of passages above said first mentioned passages through which the liquid is forced, means for supplying a heating medium for heating said second series of passages, together with a series of superposed pans in the upper part of said casing to which the liquid is delivered after passing through said second series of passages.

It is also an object of this invention to provide a drying or evaporating apparatus for liquids comprising a casing having a lower series of vertically extending passages for the liquid, an upper series of vertically extending tubes for the liquid, a plurality of evaporating pans above said tubes, means for supplying a heating medium between said tubes for heating the same, and means for heating said passages by the vapors above said pans whereby a large evaporating surface can be provided in said pans which are located at the hottest part of the casing or where the liquid is at its highest temperature.

These and other objects and advantages of the invention will be fully set forth in the following description made in connection with the accompanying drawings in which like reference characters refer to similar parts throughout the several views and in which—

Fig. 1 is a view partly in side elevation and mostly in vertical section taken on line 1—1 of Fig. 2;

Fig. 2 is a horizontal section taken on line 2—2 of Fig. 1, as indicated by the arrows, shown on a slightly different scale;

Fig. 3 is a horizontal section taken on line 3—3 of Fig. 1, as indicated by the arrows; and Fig. 4 is a vertical section taken on line 4—4 of Fig. 2, as indicated by the arrows.

Referring to the drawings, a drying or evaporating apparatus is shown comprising a casing 10. While this casing could be variously formed, in the embodiment of the invention illustrated it is shown as extending vertically and being substantially rectangular in transverse cross section. Casing 10 may be made of metal and may also be suitably insulated. The liquid to be evaporated is delivered to the lower part of casing 10 and forced upwardly therein, and while this could be variously done, in the embodiment of the invention illustrated the liquid is supplied through a stand-pipe 11 whch extends above casing 11 and has a horizontal portion 11a at its lower end communicating with a chamber 10a in the bottom of casing 10. A plate 10b extends across casing 10 forming the top of chamber 10a in which are secured the lower ends of a multiplicity of vertically extending tubes 10c, the upper ends of which are secured in a plate 10d extending horizontally across casing 10. A second chamber 10e is formed in casing 10 between plate 10d and a plate 10f spaced vertically thereabove. The tubes 10c communicate at their lower ends with chamber 10a and at their upper ends with chamber 10e. A plurality of baffle-plates 10g extend transversely of casing 10, the same having openings through which the tubes 10c pass. The upper plate 10g extends from one side of casing 10 slightly downwardly to a line adjacent the opposite side of said casing so that there is a passage around the latter end of said plate. The next plate extends from the opposite side of casing 10 to adjacent the first mentioned side from which it is slightly spaced, the same also inclining slightly downwardly. The plates 10g are continued in the described manner so that a sinuous passage is formed between said baffle plates and about the tubes 10c. Another plate 10h extends transversely and horizontally across casing 10 some distance above plate 10f. A multiplicity of spaced tubes 10i have their lower ends secured in plate 10f and their upper ends secured in plate 10h. A pipe 12 secured in the wall of casing 10 communicates with the chamber between plates 10f and 10h and an outlet pipe 13 communicates with said chamber at the opposite side of casing 10 and adjacent the top of plate 10f. Pipe 13 is provided with a valve 14 for closing and opening the passage therethrough. Pipes 12 and 13 form the inlet and outlet passages for supplying a heating medium such as steam to the chamber about tubes 10i. A plurality of pans 10j are arranged in spaced superposed relation, the bottom of the lower pan 10j being spaced some distance above plate 10h to form a chamber 10k. The pans 10j are generally of similar shape and each has a partition 10m having a number of spaced convolutions of general spiral form so that said partition with the walls of said chamber forms a continuous passage extending from one corner of said pan to the central portion of said pan. The two upper pans 10j are spaced from the wall of casing 10 at their ends and all of said pans are supported from said wall by brackets 10jj. The bottom of the lower pin extends across casing 10. The top pan 10j has a plurality of downwardly extending discharge conduits or tubes 10n leading from its central portion and these discharge into the central portion of the next lower pan 10j. Said next lower pan or the middle pan, as shown in Fig. 1, has one or more discharge tubes 10o extending downwardly from its outer portion to the outer portion of the described passage in the lowermost pan 10j. A pipe or conduit 15 communicates at its lower end with chamber 10k at one side of casing 10 and extends upwardly without casing 10 and has its upper end communicating with the corner of upper pan 10j at the outer end of the described passage therein. The pans 10j have spaced baffles 10p extending from transverse bars 10pp downwardly to adjacent the bottoms thereof and have vertical baffles 10q disposed substantially midway between baffles 10p extending upwardly from the bottoms thereof to adjacent the tops thereof. A sinuous passage is thus formed between the baffles 10p and 10q, as indicated by the arrows in Fig. 4. The lowermost pan 10j has a plurality of discharge openings 10t at its central portion which discharge into a conduit 10s which extends below said lowermost pan and to a point without casing 10. A chamber 10r is formed in casing 10 above the upper pan 10j and a conduit 16 of comparatively large size extends from adjacent the upper end of chamber 10r downwardly and communicates with the chamber between plate 10d and the uppermost baffle-plate 10g. A pipe 17 extends from the chamber between the lowermost baffle-plate 10g and plate 10b outwardly through casing 10 and is disposed closely adjacent plate 10b.

In operation the liquid to be evaporated will be supplied through the pipe 11. This liquid will enter chamber 10a and be forced upwardly through the tubes 10c. The liquid passes into chamber 10e and then passes upwardly through the tubes 10i in the chamber 10k. Steam or other heating medium is supplied through pipe 12 and circulates about the tubes 10i so that said liquid is highly heated by said steam. The heating medium can pass out through pipe 13. Pipe 13 may also act as a drain-pipe when steam is used as the heating medium and can be suitably controlled by valve 14. The liquid is conducted from chamber 10k through one or more of the pipes 15 upward to the uppermost pan 10j. The lowermost pan 10j is heated by the liquid and vapors rising from the tubes 10i into the chamber 10k. The hot vapors can pass around the lower pan and the one above it and into the space between the pans through the openings 10jj so that said pans are heated above and below by the heated vapors. The whole top portion of the casing is highly heated by the steam compartment around the tubes 10i. The liquid then travels through the passage formed by partition 10m around the baffles 10p and 10q until it reaches the central portion of the pan when it is discharged downwardly into the next pan through conduits 10n. The liquid now passes outwardly through the passage formed by partition 10m until it reaches the outer corner of the pan when it is discharged downwardly into the lowermost pan into conduits 10o. The liquid now passes inwardly following the passage formed by partition 10m until it reaches the central portion of the lowermost pan when it discharges through openings 10t into conduit 10s and is conveyed by conduit 10s to the desired point. The liquid passing through conduit 10s is highly concentrated and most of the volatiles have been evaporated therefrom. The hot vapor formed by the evaporation of the liquid passes upwardly about the ends of upper pans 10j into chamber 10r and then passes downwardly through conduit 16 into the sinuous passage formed between baffle-plates 10g so that these vapors pass back and forth about the tubes 10c and are finally drawn off through conduits 17. Suction may be exerted on pipe 17 to draw off said vapors to a suitable condenser (not shown). a partial vacuum is formed by this suction in the chamber about tubes or conduits 10c and in chamber 10i. The vapors are largely cooled before being drawn off so that most of the heat therefrom has been transmitted to the liquid rising through tubes 10c. It will be seen that the coolest vapors contact the tubes 10c at the point where the liquid is coolest. The liquid is thus gradually heated as it rises through tubes 10c and then is raised to much higher temperature as it passes through the tubes 10i. The pans 10j at the upper part of the casing become quite hot and the liquid passes in a comparatively shallow stream through the passages in said pan so that the evaporation is quite rapid.

From the above description it will be seen that I have provided a comparatively simple yet highly efficient evaporating apparatus. The operation of the apparatus is continuous and the liquid is quite effectively evaporated and concentrated. This structure is comparatively simple so that the apparatus can be quite inexpensively produced. It will be apparent that the device will have a high degree of utility for the purpose intended.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A liquid evaporating and concentrating apparatus having in combination, a casing having a chamber at the bottom thereof for receiving liquid to be evaporated, a partition forming the top of said chamber, a second partition spaced vertically from said partition, a muliplicity of spaced tubes extending between said partitions and communicating with said chamber, a third partition a short distance above said second partition forming a second chamber, a fourth partition spaced vertically from said third partition, a multiplicity of second tubes extending between said third and fourth partitions and open at their upper and lower ends, means for delivering a heating medium between said third and fourth partitions and around said second tubes, a third chamber above said fourth partition, a plurality of spaced shallow trays in said casing above said third chamber, a fourth chamber above the uppermost of said trays, means for delivering hot liquid and vapors from said third chamber to the uppermost tray and said fourth chamber, said trays having means therein for causing the liquid therein to pass in a long tortuous path and discharge from the top tray to the lower trays successively, a conduit connecting said fourth chamber to the said casing between said first and second partitions and around said first mentioned tubes, and means for withdrawing the liquid from said lowermost tray.

2. An apparatus for evaporating and concentrating liquid having in combination, a casing having a chamber at its bottom for receiving liquid to be evaporated, a plurality of passages spaced above said chamber, means for delivering liquid to said chamber and forcing the same through said passages, a second chamber for heated vapor about said passages to preliminarily heat said liquid, means for highly heating said liquid disposed above and spaced from said first mentioned passages, a plurality of vertically spaced trays disposed above said last mentioned means, a third chamber above the uppermost of said trays, means for delivering the heated liquid and vapors from said second mentioned means to said third chamber and trays, means for conveying heated vapor from said third chamber to said second chamber, said trays discharging from the top tray successively to the lower tray and having means therein for causing the liquid therein to pass through a long and tortuous passage, and means for withdrawing liquid from said lowermost tray.

3. An apparatus for evaporating and concentrating liquid having in combination, a casing having a chamber at its lower end for receiving the liquid to be evaporated, a lower set of passages through which said liquid passes upwardly in said casing, said casing having a second chamber about said passages, a second set of passages spaced above said first mentioned set through which said liquid passes, said casing having a third chamber about said second set of passages separate from and not communicating with said first mentioned chamber, means for delivering a highly heated heating medium to said third chamber, a plurality of vertically spaced trays above said second set of passages and spaced some distance above the same, said casing having a chamber therein above the uppermost of said trays, means for delivering liquid to said first mentioned chamber and forcing the same upwardly through said passages successively, means for delivering the heated liquid and vapor from said second set of passages to the uppermost tray and to said fourth chamber, means for conducting heated vapor from said fourth chamber to the top of said second chamber, said trays having means therein causing said liquid to pass through a long tortuous path and said trays above the lowermost tray discharging successively into each other and to said lowermost tray, and means for withdrawing liquid from said lowermost tray.

4. An apparatus for evaporating and concentrating liquid having in combination, a casing having a chamber at its lower end for receiving the liquid to be evaporated, a lower set of passages through which the liquid passes upwardly from said chamber, a second chamber in said casing about said passages adapted to receive a heated medium, a third chamber above said passages, a second set of passages extending upwardly from said third chamber through which said liquid passes, a fourth chamber about said second set of passages separated from said second chamber, means for delivering heated steam into said fourth chamber, a plurality of vertically spaced trays above said second set of passages, a fifth chamber above the uppermost of said trays, means for delivering liquid to said first mentioned chamber and forcing the same upwardly through said passages, means for conducting heated liquid and vapor from the upper ends of said second set of passages to the uppermost tray and said fifth chamber, said trays having means therein causing said liquid to travel through a long and tortuous path, said trays discharging downwardly successively into each other and to the lowermost tray, and means for withdrawing liquid from said lowermost tray.

5. An evaporating and concentrating apparatus having in combination, a casing having a chamber at its bottom, a multiplicity of spaced conduits extending upwardly from said chamber, a second chamber extending about said conduits, a series of spaced tubes extending upwardly in said casing above said conduits, a third chamber extending about said tubes, a fourth chamber between the bottom ends of said tubes and the upper ends of said conduits, said conduits and tubes communicating directly with said fourth chamber, means for delivering liquid to said first mentioned chamber and forcing the same upwardly, through said conduits, directly through said fourth chamber and then through said tubes, means for preliminarly heating said liquid in said conduits, means for delivering a highly heated medium into said third chamber to highly heat said liquid in said tubes and vaporize the same, a fifth chamber at the top of said casing, means for delivering liquid and vapor from the upper ends of said tubes to said fifth chamber, and a plurality of vertically spaced pans in said fifth chamber for receiving liquid and condensation from said vapor, each of said pans having circuitous passages through which the liquid collecting in said pans must pass before passing to the next lowest pan, and means for discharging the liquid outside of said casing from the lowermost pan.

6. An evaporating and concentrating apparatus having in combination, a casing having a chamber in its bottom, a multiplicity of spaced conduits extending upwardly from said chamber, a second chamber extending about said conduits, a multiplicity of spaced tubes extending upwardly in said casing vertically spaced from said conduits, a third chamber about said tubes, a fourth chamber in said casing between the upper ends of said conduits and the lower ends of said tubes into which the upper ends of said conduits discharge and from which said tubes communicate and receive liquid, means for supplying liquid to said first mentioned chamber and forcing the same upwardly through said conduits, directly through said third chamber and through said tubes, means for supplying a heating medium to said second chamber for preliminarily heating the liquid in said conduits, means for passing a highly heated medium through said third chamber for highly heating the liquid in said tubes and vaporizing the same, a fifth chamber at the top of said casing, means for conveying liquid and vapor from the top of said tubes to said fifth chamber, and means in said fifth chamber for receiving liquid and condensation from said vapor and evaporating the same, and means for delivering a concentrated liquid from said evaporating means to without said casing.

7. An evaporating and concentrating apparatus having in combination, a casing having a chamber at its bottom, a multiplicity of spaced passages extending upwardly from and communicating with said chamber, a series of spaced tubes extending upwardly in said casing above and having their lower ends spaced from said passages, said tubes having upper and lower open ends, means for delivering liquid to said chamber and forcing the same upwardly through said passages and then through said tubes, means for circulating a heating fluid about said tubes to heat said liquid therein above the boiling point, a substantially horizontal pan disposed in said casing above and spaced from said tubes with a passage therein having a series of convolutions for providing a large evaporating surface for said liquid, means for delivering liquid rising through said tubes to one end of said last mentioned passage, said pan having a discharge means at the other end of said last mentioned passage, said last mentioned passage having spaced baffle plates extending transversely thereof, alternate ones of said plates extending from the top and bottom of said pan into said last mentioned passage and spaced respectively from the top and bottom of said last mentioned passage.

RALPH J. SERPAS.

REFERENCES CITED

The following references are of record in the file of this patent:

UNITED STATES PATENTS

| Number | Name | Date |
|---|---|---|
| 53,422 | De Tar | Mar. 27, 1866 |
| 191,512 | Bennett | June 5, 1877 |
| 1,049,935 | Soule | Jan. 7, 1913 |
| 1,145,728 | Wiegand | July 6, 1915 |
| 1,213,596 | De Baufree | Jan. 23, 1917 |
| 1,401,578 | Bleicken | Dec. 27, 1921 |
| 1,418,885 | Schulze | Jan. 6, 1922 |
| 1,433,040 | Sandberg | Oct. 24, 1922 |
| 1,780,818 | Friend | Nov. 4, 1930 |
| 1,848,197 | Ray et al. | Mar. 8, 1932 |
| 1,996,526 | Serpas | Apr. 2, 1935 |
| 2,226,828 | Moran | Dec. 31, 1940 |

FOREIGN PATENTS

| Number | Country | Date |
|---|---|---|
| 569,043 | France | Jan. 3, 1924 |